(12) United States Patent
Yamamoto

(10) Patent No.: US 9,643,449 B2
(45) Date of Patent: May 9, 2017

(54) TRANSFER PRINTING METHOD OF ELECTRONIC IMAGE AND TRANSFER SHEET

(71) Applicant: YUGEN KAISHA KOWATECHNOA, Fukui (JP)

(72) Inventor: Kaoru Yamamoto, Fukui (JP)

(73) Assignee: YUGEN KAISHA KOWATECHNOA, Fukui (JP)

(*) Notice: Subject to any disclaimer, the term of this patent is extended or adjusted under 35 U.S.C. 154(b) by 0 days.

(21) Appl. No.: 14/820,925

(22) Filed: Aug. 7, 2015

(65) Prior Publication Data
US 2015/0343836 A1    Dec. 3, 2015

Related U.S. Application Data

(62) Division of application No. 14/113,431, filed as application No. PCT/JP2011/061410 on May 18, 2011, now abandoned.

(51) Int. Cl.
*B44C 1/17* (2006.01)
*B32B 37/06* (2006.01)
(Continued)

(52) U.S. Cl.
CPC .......... *B44C 1/1712* (2013.01); *B32B 37/025* (2013.01); *B32B 37/06* (2013.01);
(Continued)

(58) Field of Classification Search
CPC ...... B41M 5/03; B41M 4/025; B41M 5/0017; B41M 5/0256; B41C 1/00; B41C 1/06;
(Continued)

(56) References Cited

U.S. PATENT DOCUMENTS 2,159,693 A    5/1939  Gaylord, Jr.
4,044,181 A    8/1977  Edhlund
(Continued)

FOREIGN PATENT DOCUMENTS

EP    0893269    1/1999
EP    1040936    10/2000
(Continued)

OTHER PUBLICATIONS

Notice of Reasons for Refusal issued Dec. 18, 2013, in Japanese Application No. 2010-014208 (with English translation).
(Continued)

*Primary Examiner* — David Banh
(74) *Attorney, Agent, or Firm* — Wenderoth, Lind & Ponack, L.L.P.

(57) ABSTRACT

A transfer sheet is provided, whereby a T-shirt or the like can be printed in few steps by means of an electronic image forming device that uses powdered toner, liquid ink, or the like containing a plastic resin. By means of mirror-image printing a picture pattern, which is an electronic image, onto a first sheet, aligning the first sheet and a second sheet, and heat-pressing, a coating is spread over a portion of the picture pattern printed onto the first sheet. The first sheet has a structure including a mold release layer, a resin layer, and a porous resin layer in a substrate, and the second sheet includes a mold release layer, a resin layer, an adhesive layer, and a colored porous resin layer in a substrate.

2 Claims, 7 Drawing Sheets

(51) Int. Cl.
  *B32B 37/10* (2006.01)
  *B32B 37/00* (2006.01)
  *B41M 5/025* (2006.01)
  *D06P 5/24* (2006.01)
  *D06P 5/28* (2006.01)
  *D06P 5/30* (2006.01)
  *B41F 16/00* (2006.01)

(52) U.S. Cl.
  CPC .............. *B32B 37/10* (2013.01); *B41F 16/00* (2013.01); *B41M 5/0256* (2013.01); *B44C 1/1725* (2013.01); *D06P 5/003* (2013.01); *D06P 5/005* (2013.01); *D06P 5/30* (2013.01); *Y10T 428/1476* (2015.01); *Y10T 428/24851* (2015.01)

(58) Field of Classification Search
  CPC ......... B41C 1/10; B44C 1/1712; B32B 37/06; B32B 37/10; B32B 37/025
  See application file for complete search history.

(56) References Cited

U.S. PATENT DOCUMENTS

| | | | |
|---|---|---|---|
| 5,432,258 | A | 7/1995 | Yoshimura |
| 5,560,796 | A | 10/1996 | Yoshimura |
| 6,425,324 | B1 | 7/2002 | Yamamoto |
| 2002/0025208 | A1 | 2/2002 | Sato et al. |
| 2002/0068155 | A1* | 6/2002 | Ozaki ............... B44C 1/1712 428/195.1 |
| 2006/0019043 | A1 | 1/2006 | Kronzer |
| 2006/0169399 | A1 | 8/2006 | Kronzer |
| 2006/0172094 | A1 | 8/2006 | Shi et al. |
| 2009/0023586 | A1* | 1/2009 | Zinman ............... B41M 5/035 503/201 |
| 2009/0250164 | A1 | 10/2009 | Carrle et al. |
| 2011/0155007 | A1 | 6/2011 | Liu |
| 2012/0062671 | A1 | 3/2012 | Liu |

FOREIGN PATENT DOCUMENTS

| | | |
|---|---|---|
| JP | 6-227200 | 8/1994 |
| JP | 10-016498 | 1/1998 |
| JP | 11-11005 | 1/1999 |
| JP | 2000-94893 | 4/2000 |
| JP | 2000-290883 | 10/2000 |
| JP | 2001-063292 | 3/2001 |
| JP | 3182640 | 7/2001 |
| JP | 2004-232148 | 8/2004 |
| JP | 3561775 | 9/2004 |
| JP | 2009-066789 | 4/2009 |
| JP | 2010-099940 | 5/2010 |
| WO | 2006/081513 | 8/2006 |

OTHER PUBLICATIONS

Extended European Search Report issued Nov. 3, 2014, in European Application No. 11865508.3.
International Search Report issued Aug. 9, 2011 in International (PCT) Application No. PCT/JP2011/061410.

* cited by examiner

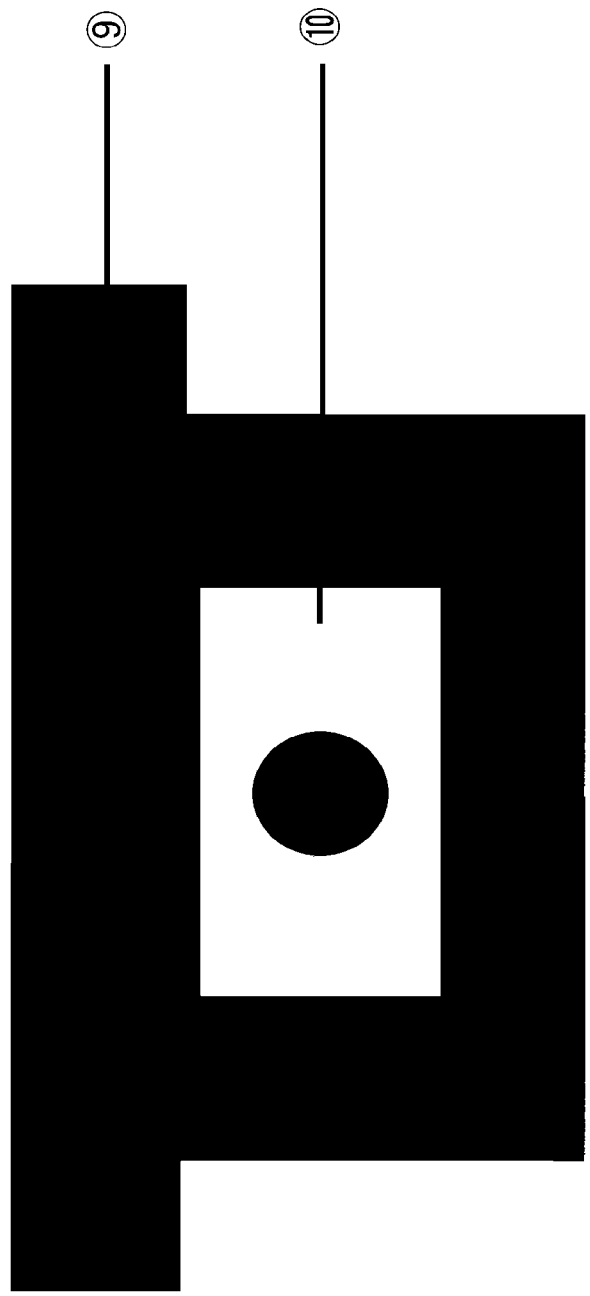

TRANSFER PRINTING METHOD OF ELECTRONIC IMAGE AND TRANSFER SHEET

BACKGROUND OF THE INVENTION

1. Technical Field

The present invention relates to a method causing an electronic image obtained by an electronic image forming apparatus to be supported by a transfer sheet and performing transfer printing on a surface of a fabric such as T-shirt or the like, and the transfer sheet.

2. Background Art

In recent years, a tendency of individualization of products has been specifically spreading, and wide-varieties and small-lot production of products has been inevitable. However, since the production cost is limited, how to manufacture a pattern, design and the like to be formed simply on a surface of a fabric such as a T-shirt at low cost is a major challenge. Therefore, graphics or a pattern of one's choice may be printed on the fabric surface by using an electronic image forming apparatus as a printing method configured to satisfy such a demand, reflecting a predetermined image on a thermal transfer sheet by this apparatus, placing the thermal transfer sheet on the fabric surface, and applying a pressure at a high temperature.

Incidentally, there are various printing methods of this type in the related art. For example, "A PRINTING METHOD OF AN ELECTRONIC IMAGE AND A THERMAL TRANSFER SHEET" disclosed in Japanese Patent No. 3182640 includes steps of: using two sheets: a sheet A composed of a substrate layer, a release layer, a polyvinyl acetate layer (PVA layer) or a polyester resin layer, and a sheet B composed of a substrate layer, a release layer, an adhesive layer, and a color layer; making a photocopy on a surface of either one of the sheets and forming a predetermined pattern or characters by a toner layer; stacking the both sheets one on top of another with the toner layer interposed therebetween and heating and pressing the same at a predetermined temperature; then, separating the both sheets off from each other to form the color layer and the adhesive layer of the separated sheet B on the toner layer of the sheet A; sticking the sheet A to a product such as the T-shirt and separating the substrate layer together with the release layer from the product; heating and pressing further at a predetermined temperature; and then separating and removing the polyvinyl acetate layer (PVA layer) or the polyester resin layer on the surface thereof from the product.

In other words, using the PVA layer as a medium, the medium is separated from the thermal transfer sheet substrate layer when performing transfer printing on the fabric, the medium carrying the electronic image is placed on the fabric and is pressed by heat, then the medium is separated, whereby the transfer printing of the electronic image is terminated. Therefore, the steps of separating needs to be performed twice after the transfer sheet is formed, and the toner layer of the printed electronic image is situated on the surface, so that physical property against rubbing or the like is rather inferior, and a lot of time and troubles are required.

"A METHOD OF PRINTING AN ELECTRONIC IMAGE" disclosed in Japanese Patent No. 3561775 is a method of printing characters and graphics or a pattern of white or milky white color on the surface of a color fabric such as black.

A negative photocopy of the characters, graphics, or the pattern is made on a copy sheet, the negative photocopy is superimposed on a sheet B having a release layer, an adhesive layer, and a milky white layer layered on a substrate layer and pressurized for a predetermined time under a high temperature and a high pressure. Then, by pealing the copy sheet off, the milky white layer and the adhesive layer separated from the release layer is adhered to toner and parts of the milky white layer and the adhesive layer on the side of the sheet B are removed, so that the remaining milky white layer and the adhesive layer form the characters or the graphics to be printed. Then a sheet A having a release layer and a resin layer layered on a substrate layer is superimposed on the sheet B and is pressurized for a predetermined time under a high temperature and a high pressure. Subsequently, by separating the sheet A off, the milky white layer and the adhesive layer separated from the sheet B are adhered to the surface of the resin layer on the sheet A. The sheet A is placed on a predetermined fabric surface and is pressurized for a predetermine time under the high temperature and the high pressure in the same manner, and then the sheet A is separated. Consequently, characters, graphics, or a pattern in milky white color or a white color may be printed on the fabric surface.

In other words, a positive image white adhesive material sheet as the sheet B is obtained by drawing a negative image on a normal sheet with black toner, superimposing a white adhesive material sheet as the sheet B thereon, thermally pressing the sheets, separating the sheets away from each other while the sheets are hot so that an unnecessary portion of a white adhesive material on the white adhesive material sheet as the sheet B is adhered to the black toner on the normal sheet and thus removed and only a necessary positive image remains and drawn on the white adhesive material sheet as the sheet B.

Subsequently, a transfer sheet is prepared by mirror-printing a pictorial pattern of an electronic image on the other transfer sheet A, superimposing the sheet A on the positive image white adhesive material sheet as the sheet B and thermally pressing the sheets, separating the sheet B from the sheet A, and transferring the white adhesive material layer as the positive image on the sheet B onto the pictorial pattern on the sheet A. Since the process of preparing the transfer sheet requires two times of thermal press process and aligning of the pictorial pattern on the sheet A and the positive image on the sheet B, a lot of time and troubles are required.

Problem to be Solved by the Invention

Examples of general electronic image forming apparatuses include color copying machines installed in convenience stores and color laser printers or ink jet printers sold for family use. Toner and ink of the color copying machine, color laser printers, and the ink jet printers do not include white color, and color material itself is composed of dye or pigment, transparent resin, and the like. Therefore, when a material to which the image is to be transferred is black, for example, the ink used in these printers is inferior in masking property and hence sharp images cannot be formed.

Therefore, technologies as described in the related art are used. However, in a preparation of the transfer sheet, these technologies require two times of thermal press processes or separating the medium off before the transfer printing on the material to which the image is to be transferred, and hence double work is required. These technologies are used because there is no white color and hence the masking property is not sufficient in the electronic image forming apparatus.

However, the electronic image forming apparatuses in recent years include machine types having a bottle containing transparent resin without color pigment in addition to the normal color toner or color ink bottles. Examples of the color laser printers include image PRESS C1+ manufactured by CANON Inc., in which clear toner is used as the fifth toner, and examples of ink jet printers include a glass optimizer of Colorio PX-G5300 type manufactured by Seiko Epson Corp. These functions are mounted in order to gloss over a printed result.

There is provided a method of printing an electronic image configured to allow further cutting down of the process of preparing a transfer sheet and a transfer printing work with respect to a printing workpiece in technologies of the transfer print of the related art, further cost reduction, and various types of transfer printing onto a printing workpiece simply in a short time by using the electronic image forming apparatuses as described above.

SUMMARY OF THE INVENTION

In the present invention, two types of sheets; a sheet A and a sheet B are used, and a predetermined pattern or characters are printed on either one of the sheet A and the sheet B by using an electronic image forming apparatus. As a matter of course, an ink layer or a toner layer containing a resin is formed only on parts of pattern and characters on the sheet surface. The sheet A described above is a sheet composed of a substrate layer, a release layer, a resin layer, and a porous resin layer, laminated one on top of another. The sheet B is a sheet including a substrate layer, a release layer, an adhesive layer, and a white porous resin layer having color material such as white mixed therein, laminated one on top of another.

Here, both color materials, ink composed of pigment and resin for ink jet machine and resin toner for a laser printer or for a copier are referred to as "ink/resin toner". The above described ink/resin toner layer is formed on the porous resin layer or the white porous resin layer, and the sheet A and the sheet B are superimposed with the porous resin layer and the white porous resin layer faced each other with ink/resin toner layers formed on the surfaces thereof interposed therebetween.

In this state, the sheets are heated to a temperature in a range from 110° C. to 140° C. and pressed, whereby the ink/resin toner is softened to adhere the sheet A and the sheet B. Then, when an attempt is made to separate the sheet A and the sheet B, the separation is not started from the above-described ink/resin toner layer, but the adhesive layer of the sheet B is separated from the release layer and is adhered to the sheet A side only on the ink/resin toner layer, thereby being separated apart from each other.

In other words, the adhesive layer of the sheet B is separated at and from the release layer and transferred to the sheet A, whereby the transfer sheet A is obtained. Then, the transfer sheet A with the adhesive layer is placed on the fabric surface or the like, and is heated to a temperature in the range from 110° C. to 140° C. and is pressed. Therefore, the transfer sheet A is secured to the fabric surface or the like via the adhesive layer, and then, the transfer sheet A is peeled off. However, since a color layer is interposed under the ink/resin toner layer, the original color of the ink/resin toner is printed without being affected by the color of the fabric surface or the like to be printed. Then, a clearer and robust transfer printed material even being subject to washing may be formed on the ink/resin toner layer by being covered with the porous resin and the resin layer.

Advantages of the Invention

According to a printing method of the present invention, the two types of sheets; the sheet A and the sheet B are used, the electronic image formed of the ink/resin toner is drawn on one of the sheets, both of the sheets A and B are superimposed on one another and bought into adhesion with heat, and then are separated, so that the color layer and the adhesive layer are formed on the ink/resin toner layer.

Then, for example, since white color expression may be expressed on a black printed material by the transparent ink/resin toner, a process of forming a negative photocopy on the normal paper, forming a positive adhesive layer by aligning the same with a milky white adhesive sheet, and aligning the positive adhesive layer on the image on the sheet A is no longer necessary. In addition, since the transfer printing of the surface of the ink/resin toner layer alter the transfer is achieved by thermally pressing the transfer sheet even without separating the medium and, in addition, the ink/resin toner layer may be covered with the porous resin layer and the resin layer, the washing property is improved, so that a simple, quick and, in addition, low-cost transfer printing is enabled.

BRIEF DESCRIPTION OF THE DRAWINGS

FIG. 7 is a state in which an electronic image of the "Hinomaru" flag, i.e. the national flag of Japan is printed on a T-shirt.

DETAILED DESCRIPTION OF THE INVENTION

Embodiment 1

Figure 1:
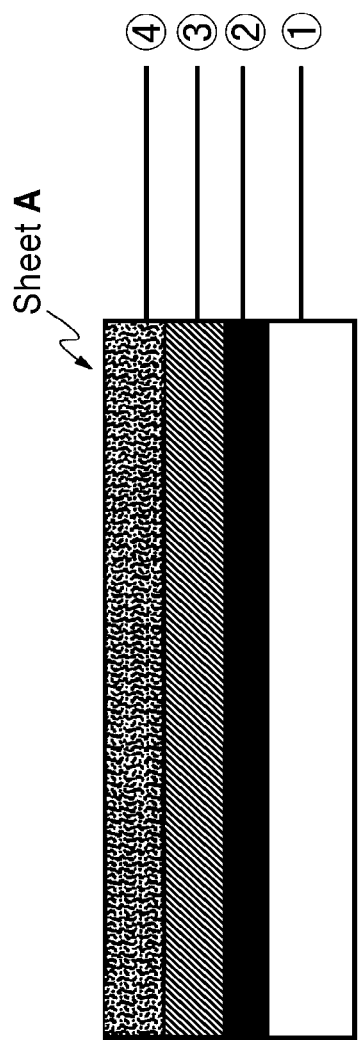
FIG. 1 illustrates a sheet A.

Examples of a substrate layer 1 of a sheet A illustrated in FIG. 1 include a paper sheet or a film. Here, on coated paper (for example, a coat 110 manufactured by Nippon Paper Industries Co., Ltd.), a release layer 2 (for example, Silicon KS3502 manufactured by Shin-Etsu Chemical Co., Ltd), a resin layer 3 (for example, a cover coat resin 300 manufactured by Goo Chemical Co., LTD), a porous resin layer 4 (for example, a mixture of FPS-2 silica manufactured by Shionogi & Co., Ltd. and a transparent urethane resin of UD710 manufactured by Dainichiseika Color & Chemicals MFG. CO., Ltd. or the like) were provided, and respective layers were laminated into a single sheet A.

Although the lamination of the sheet A was transparent, by mixing white titanium oxide as a color material, into the resin layer 3 or the porous resin layer 4, the printed workpiece was finally covered with white and becomes white irrespective of the color of an ink/resin toner. Other color materials may also be mixed.

Figure 2:
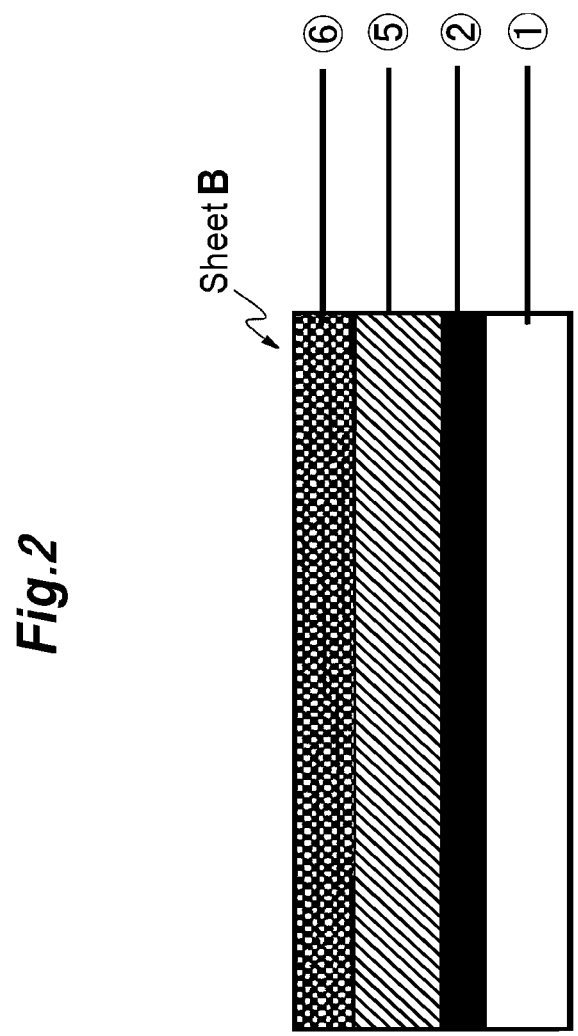
FIG. 2 illustrates a sheet B.

Examples of the substrate layer 1 of a sheet B illustrated in FIG. 2 include paper or a film. Although ST600KT manufactured by Lintec Corporation, which is processed up to the release layer 2, may be used, here, coated paper (for example, the coat 110 manufactured by Nippon Paper Industries Co., Ltd.), the release layer 2 (for example, Silicon KS776L manufactured by Shin-Etsu Chemical Co., Ltd), an adhesive layer 5 (for example, CRISVON AH4555 manufactured by DIC Corporation), and a white porous resin layer 6 (for example, a mixture of FPS-2 silica and titanium oxide manufactured by Shionogi & Co., Ltd. and a urethane resin of UD710 manufactured by Dainichiseika Color & Chemicals MFG. CO., Ltd. or the like) were provided, and respective layers were laminated into a single sheet B. The sheet B becomes transparent if white titanium oxide, which is a color material, was not added. Other color materials may also be mixed. If the transparent ink/resin toner of the electronic image forming apparatus is the white ink/resin toner, the sheet B may remain transparent.

Figure 3:
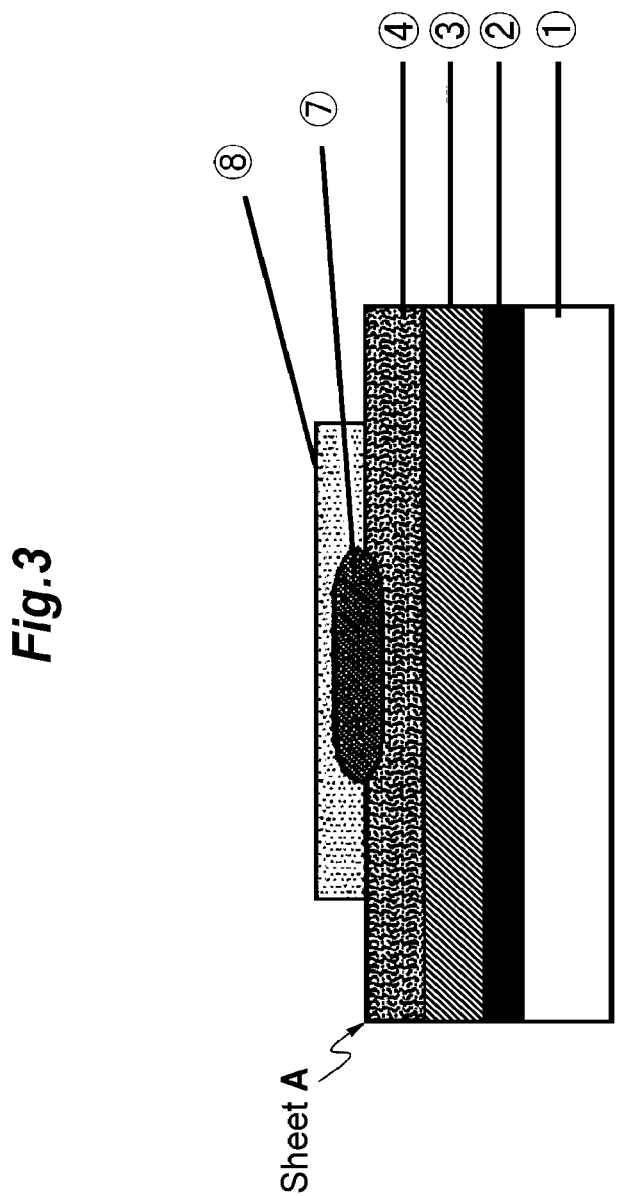
FIG. 3 illustrates the sheet A printed by ink/resin toner.

When "Hinomaru" (disc of the sun), which is a main portion of the Japanese national flag, was printed with a color laser printer (for example, image PRESS C1+ manufactured by CANON Inc.) on the sheet A in FIG. 1 described above, the toner layer 7 which expresses a red disc was printed, while square white part of the flag around the disc was drawn by a transparent toner layer 8 and, as illustrated in FIG. 3, the toner layers 7 and 8 of the "Hinomaru" image of the Japanese flag of an electronic image was formed on the porous resin layer 4 on the sheet A.

Figure 4:
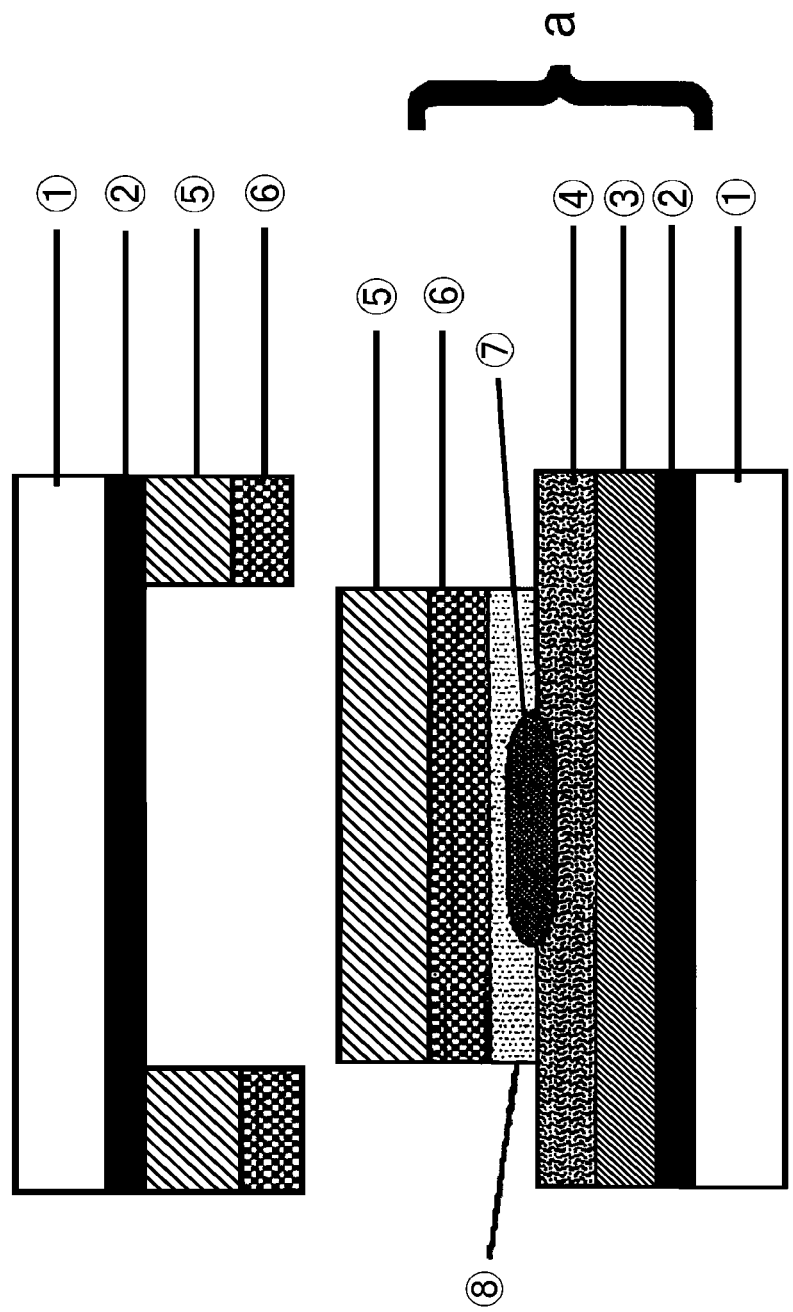
FIG. 4 illustrates a state in which the sheet B is superimposed on the printed sheet A and is separated, so that a transfer sheet A is prepared.

Subsequently, the sheet B was superimposed on the sheet A with the above-described toner layers 7 and 8 on which the image of the "Hinomaru" flag, which is the Japanese flag, was printed with the color laser printer interposed therebetween in a state in which the porous resin layer 4 and the white porous resin layer 6 faced each other. Then, in this state, the sheets were heated to a temperature in a range from 120° C. to 130° C. and pressed at a pressure on the order of 300 g/cm² for 20 seconds, the toner was softened and the sheet A and the sheet B were adhered to each other. Subsequently, when an attempt was made to separate the sheet A and the sheet B, the separation was not started from the above-described toner layers 7, 8, but the adhesive layer 5 on the sheet B was separated from the release layer 2, and was adhered only to a portion of the sheet A side where a "Hinomaru" (red disc) image formed of the toner layer 7 of the electronic image of the "Hinomaru" flag was drawn and to a square flag portion formed of the transparent toner layer 8 formed around the "Hinomaru" image, thereafter the layers 2, 7 and 8 being separated apart from the release layer 2 (see FIG. 4).

Figure 5:
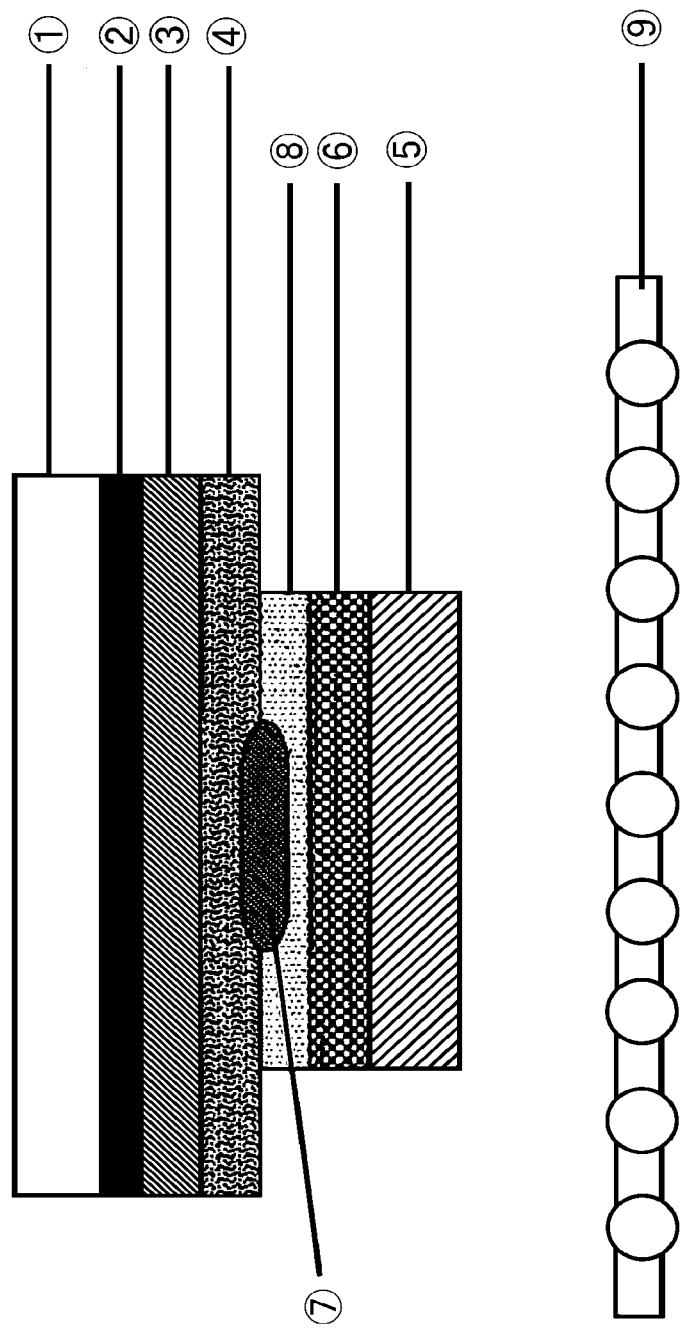
FIG. 5 is a state in which the transfer sheet A is placed on a T-shirt.
Figure 6:
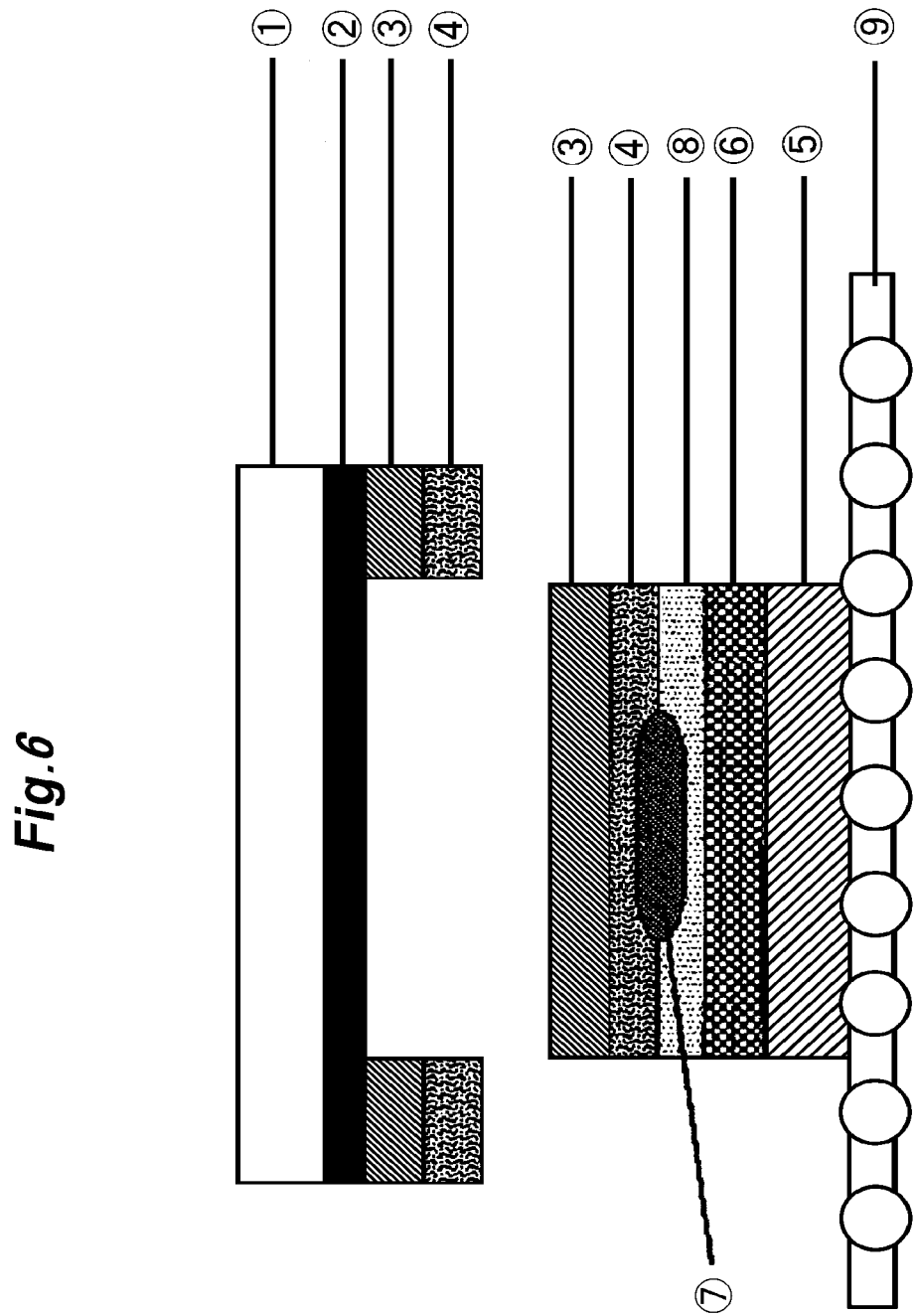
FIG. 6 illustrates a state in which the transfer sheet A is separated and an ink/resin toner layer is transferred to the T-shirt in a state of being covered.

The white porous resin layer 6 and the adhesive layer 5 on the sheet B were transferred to the sheet A, resulting in that a transfer sheet A illustrated in FIG. 4a was formed. As illustrated in FIG. 5, in a state that the adhesive layer 5 of the transfer sheet A was placed on the black T-shirt 9, the sheets were heated to a temperature in a range from 120° to 130° C., and were pressed for approximately 20 seconds at a pressure on the order of 300 g/cm². Thereby, the transfer sheet A was secured to the fabric surface via the adhesive layer 5. Subsequently, when the transfer sheet A was peeled off as illustrated in FIG. 6, a red "Hinomaru" image was clearly drawn on a white flag on the black T-shirt 9, and the national flag of Japan 10 was printed as illustrated in FIG. 7.

Incidentally, when 25 g of Attack ALLin (a bleaching agent with a fabric softener contained therein) manufactured by Kao Corporation was put in 30 L of warm water at a temperature of 50° C. in a dual tub washing machine of Ginga 2.2 (VH-22083) of Toshiba Corporation, and the printed black T-shirt 9 was dipped therein and was subjected to washing for 15 minutes and rinsing for 15 minutes in a strong current of washing water, and to dehydrating for 5 minutes and drying repeatedly by three times. Then, it was recognized that no color loosing and no peeling of the transferred image occurred. Also, a clothes iron for family use heated to a medium temperature of 150° C. was placed directly on the "Hinomaru" flag image 10 printed on the black T-shirt 9 and was slid laterally as is after 5 seconds, the resin toner layers 7, 8 covered with the resin layer 3 and the porous resin layer 4 on the sheet A were not melted and the "Hinomaru" flag image 10 clearly remained on the black T-shirt 9.

Embodiment 2

A red disc image of "Hinomaru" as of Japanese national flag was printed with ink 7 by an ink jet printer (Colorio PX-G5300 type manufactured by Seiko Epson Corp.) on the above-described sheet A illustrated in FIG. 1, and then the sheet A was set so that the "Hinomaru" image was aligned to the center, and a square flag image which corresponds to the white portion was drawn therearound with the transparent ink 8 with an ink jet printer (Colorio PX-V630 type manufactured by Seiko Epson Corp) in which gloss optimizer manufactured by Seiko Epson Corp., which is transparent ink, was filled in all of ink bottles thereof) (See FIG. 3).

The ink layers 7 and 8 of the electronic image of the "Hinomaru" flag were formed on the porous resin layer 4 on the sheet A. Subsequently, the sheet B was superimposed on the sheet A in the state in which the porous resin layer 4 and the white porous resin layer 6 face each other with the ink layers 7 and 8 interposed therebetween and, in this state, the sheets were heated to a temperature in the range from 120° C. to 130° C. and was pressed for approximately for 20 seconds at a pressure on the order of approximately 300 g/cm². The ink layers 7, 8 were softened and bonded the sheet A and the sheet B to each other. Then, when an attempt was made to separate the sheet A and the sheet B, the separation was not started from the above-described ink layers 7, 8, but the adhesive layer 5 on the sheet B was separated from the release layer 2 and was adhered only to a portion of the sheet A side where a "Hinomaru" (red disc) image formed of the ink layer 7 of the electronic image of the "Hinomaru" flag was drawn and to a square flag portion formed of the transparent toner layer 8 formed around the "Hinomaru" image, thereafter the layers 2, 7 and 8 being separated apart from each other (See FIG. 4).

The white porous resin 6 and the adhesive layer 5 on the sheet B were transferred to the sheet A, resulting in that a transfer sheet A was formed. Then, as illustrated in FIG. 5, in a state that the adhesive layer 5 of the transfer sheet A was placed on the black T-shirt 9, the sheets were heated to a temperature in the range from 120° C. to 130° C., and were pressed for approximately 20 seconds at a pressure on the order of 300 g/cm². Thereby, the transfer sheet A was secured to the fabric surface or the like via the adhesive layer 5. When the transfer sheet A was peeled off as in FIG. 6, a red "Hinomaru" was clearly drawn and printed on a white flag on the black T-shirt 9 (see FIG. 7).

When 25 g of Attack ALLin (with bleaching agent and fabric softener contained therein) manufactured by Kao Corporation was put in 30 L of warm water at a temperature of 50° C. in a dual tub washing machine of Ginga 2.2

(VH-22083) of Toshiba Corporation, and the printed black T-shirt 9 was dipped therein and was subjected to washing for 15 minutes and rinsing for 15 minutes in a strong current of washing water, and to dehydrating for 5 minutes and drying repeatedly by three times. Consequently, it was recognized that no color loosing and separation occurred. Aso, a clothes iron for family use heated to a medium temperature of 150° C. was placed directly on the "Hinomaru" flag printed on the black T-shirt 9 and was slid laterally as is after 5 seconds, the ink covered with the resin layer 3 and the porous resin layer 4 on the sheet A was not melted and the "Hinomaru" flag 10 clearly remained on the black T-shirt 9.

REFERENCE SIGNS LIST 1 substrate layer
2 release layer
3 resin layer
4 porous resin layer
5 adhesive layer
6 white porous resin layer
7 ink/resin toner layer
8 transparent ink/resin toner layer
9 T-shirt
10 "Hinomaru" flag

The invention claimed is:

1. A method of manufacturing a transfer sheet, comprising:
   forming a first sheet by the steps of:
   providing a first release layer laminated on top of a first substrate layer,
   laminating a resin layer on top of said first release layer,
   laminating a porous resin layer on top of said resin layer,
   forming a colored ink or resin toner layer on said porous resin layer by laser printing mirror images of desired images with at least one colored ink or resin toner material, and
   forming a transparent ink or resin toner layer on said porous resin layer and said colored ink or resin toner layer by ink jet printing a transparent ink or resin toner material;
   arranging a second sheet comprising a second release layer laminated on top of a second substrate layer, an adhesive layer laminated on top of said second release layer, and a white porous resin layer laminated on top of said adhesive layer;
   superimposing said second sheet onto said first sheet such that said white porous resin layer of said second sheet contacts at least one of said colored ink or resin toner layer of said first sheet and said transparent ink or resin toner layer of said first sheet;
   heating and pressing said first sheet and said second sheet which have been superimposed; and
   separating and removing said second sheet from said first sheet such that said white porous resin layer and said adhesive layer remain partly adhered to at least one of said colored ink or resin toner layer of said first sheet and said transparent ink or resin toner layer of said first sheet, and are separated from said second release layer of said second sheet, so as to produce said transfer sheet including said first sheet, said white porous resin layer and said adhesive layer.

2. A method of manufacturing a transfer sheet comprising a first release layer laminated on top of a first substrate layer, a resin layer laminated on top of said release layer, a porous resin layer laminated on top of said resin layer, a transparent ink or resin toner layer laminated on top of said porous resin layer, a colored ink or resin toner layer configured to represent images and interposed between said porous resin layer and said transparent ink or resin toner layer, a white porous resin layer laminated on top of said transparent ink or resin toner layer, and an adhesive layer laminated on top of said white porous resin layer, said method comprising:
   forming a first sheet by the steps of:
   providing a first release layer laminated on top of a first substrate layer,
   laminating a resin layer on top of said first release layer,
   laminating a porous resin layer on top of said resin layer,
   forming a colored ink or resin toner layer on said porous resin layer by laser printing mirror images of desired images with at least one colored ink or resin toner material, and
   forming a transparent ink or resin toner layer on said porous resin layer and said colored ink or resin toner layer by ink jet printing a transparent ink or resin toner material;
   arranging a second sheet comprising a second release layer laminated on top of a second substrate layer, an adhesive layer laminated on top of said second release layer, and a white porous resin layer laminated on top of said adhesive layer;
   superimposing said second sheet onto said first sheet such that said white porous resin layer of said second sheet contacts at least one of said colored ink or resin toner layer of said first sheet and said transparent ink or resin toner layer of said first sheet;
   heating and pressing said first sheet and said second sheet which have been superimposed; and
   separating and removing said second sheet from said first sheet such that said white porous resin layer and said adhesive layer remain partly adhered to at least one of said colored ink or resin toner layer of said first sheet and said transparent ink or resin toner layer of said first sheet, and are separated from said second release layer of said second sheet, so as to produce said transfer sheet including said first sheet, said white porous resin layer and said adhesive layer.

* * * * *